United States Patent
Takeda

(10) Patent No.: US 10,895,314 B2
(45) Date of Patent: Jan. 19, 2021

(54) GEAR BOX, REDUCTION GEAR EQUIPPED WITH GEAR BOX, MOTOR UNIT, MOLD FOR MANUFACTURING GEAR BOX, AND MANUFACTURING METHOD OF GEAR BOX

(71) Applicant: MABUCHI MOTOR CO., LTD., Chiba (JP)

(72) Inventor: Makoto Takeda, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 16/278,745

(22) Filed: Feb. 19, 2019

(65) Prior Publication Data
US 2019/0353239 A1   Nov. 21, 2019

(30) Foreign Application Priority Data
May 15, 2018   (JP) .................... 2018-093901

(51) Int. Cl.
*F16H 57/02*   (2012.01)
*H02K 7/116*   (2006.01)
(Continued)

(52) U.S. Cl.
CPC ........... *F16H 57/02* (2013.01); *B29C 70/681* (2013.01); *F16H 1/16* (2013.01); *H01R 13/405* (2013.01);
(Continued)

(58) Field of Classification Search
CPC ...... H02K 7/003; H02K 7/116; B29C 70/681; B29L 2031/749; F16H 1/16; F16H 2057/02034; F16H 57/02; H01R 13/405
(Continued)

(56) References Cited

U.S. PATENT DOCUMENTS

| 9,570,957 B2 | 2/2017 | Tamaki et al. |
| 2002/0047379 A1* | 4/2002 | Torii .................. H02K 5/10 310/89 |

(Continued)

FOREIGN PATENT DOCUMENTS

JP   6234713 B2   11/2017

OTHER PUBLICATIONS

Office Action in CN Application No. 201910247732.3, dated Nov. 17, 2020, 17pp.

*Primary Examiner* — Tulsidas C Patel
*Assistant Examiner* — Rashad H Johnson
(74) *Attorney, Agent, or Firm* — Hauptman Ham, LLP

(57) ABSTRACT

A gear box includes a gear box body, and a terminal which is integrated with the gear box body. The gear box body includes a storage portion which stores a gear, a motor insertion portion, recessed in an attachment surface of a motor, and a connector connection portion on the same side as the motor insertion portion with respect to a rotation center of the gear and is open in a direction different from the motor insertion portion. The terminal includes the connector terminal which is exposed to the inside of the connector connection portion, a motor feeding portion which is exposed to the inside of the motor insertion portion, a connecting portion which is in the gear box body and connects the connector terminal and the motor feeding portion, and a fixing tab extending from the connecting portion and exposed to the inside of the motor insertion portion.

10 Claims, 7 Drawing Sheets

(51) Int. Cl.
    *H02K 7/00*         (2006.01)
    *B29C 70/68*       (2006.01)
    *H01R 13/405*    (2006.01)
    *F16H 1/16*         (2006.01)
    *B29L 31/00*       (2006.01)

(52) U.S. Cl.
    CPC ............ *H02K 7/003* (2013.01); *H02K 7/116* (2013.01); *B29L 2031/749* (2013.01); *F16H 2057/02034* (2013.01)

(58) Field of Classification Search
    USPC ..................................................... 310/75, 83
    See application file for complete search history.

(56) References Cited

U.S. PATENT DOCUMENTS

| | | | | |
|---|---|---|---|---|
| 2012/0098364 A1* | 4/2012 | Inoue | ............... | H02K 5/225 310/71 |
| 2012/0112579 A1* | 5/2012 | Kokubu | ............... | H02K 5/225 310/71 |
| 2012/0161559 A1* | 6/2012 | Mizutani | ............... | H02K 5/148 310/71 |
| 2012/0161560 A1* | 6/2012 | Mizutani | ............... | H02K 5/148 310/71 |
| 2012/0194020 A1* | 8/2012 | Mizutani | ............... | H02K 5/148 310/83 |
| 2014/0373658 A1* | 12/2014 | Tamaki | ............... | H02K 7/1166 74/425 |
| 2018/0205287 A1* | 7/2018 | Tozuka | ............... | H02K 5/148 |

\* cited by examiner

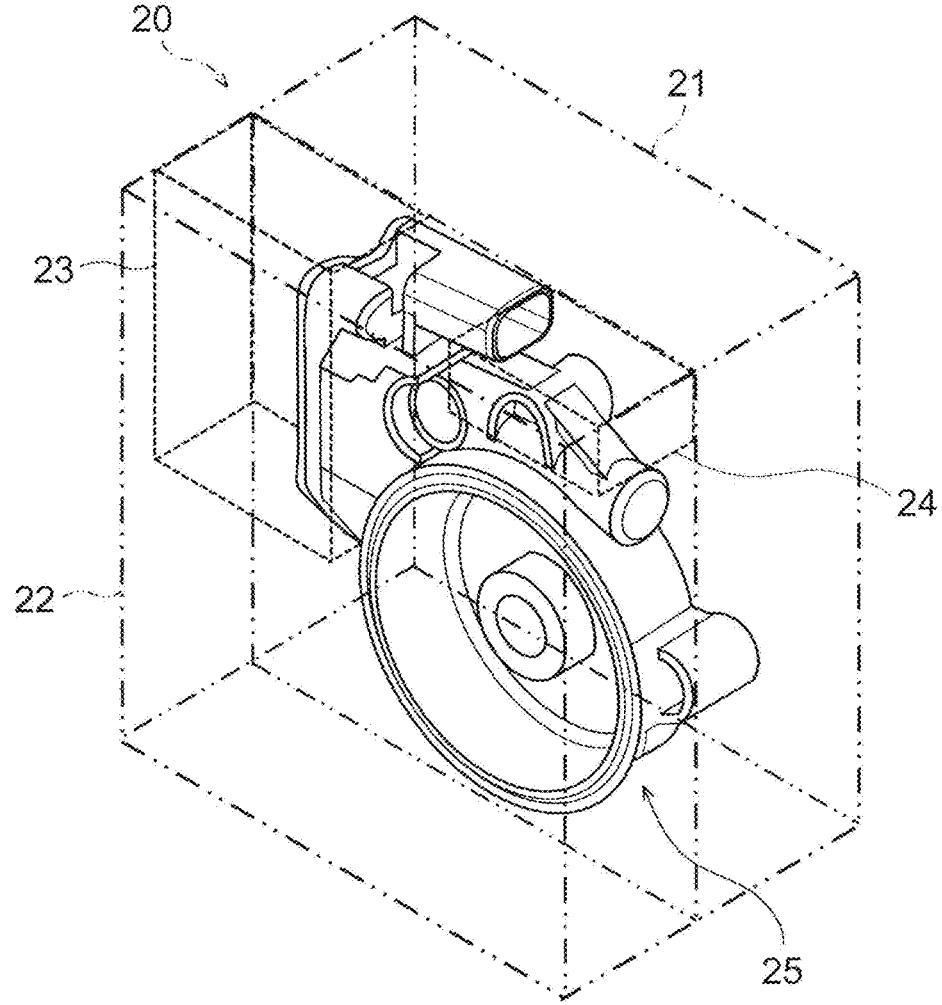

GEAR BOX, REDUCTION GEAR EQUIPPED WITH GEAR BOX, MOTOR UNIT, MOLD FOR MANUFACTURING GEAR BOX, AND MANUFACTURING METHOD OF GEAR BOX

RELATED APPLICATIONS

The present application claims priority to Japanese Application No. 2018-093901 filed May 15, 2018, the disclosure of which is hereby incorporated by reference herein in its entirety.

BACKGROUND

1. Technical Field

The present invention relates to a gear box which integrally forms a metal terminal and a resin gear box body by insert molding, a reduction gear equipped with the gear box, a motor unit, a mold for manufacturing the gear box, and a manufacturing method of the gear box.

2. Description of the Related Art

Conventionally, a motor unit in which a motor of a power source and a reduction gear are integrated is used in an in-vehicle electric equipment and an appliance. The reduction gear is configured such that a worm rotating integrally with a motor shaft and a helical gear (worm wheel) engaged with the worm are embedded in the gear box. In the gear box, there are provided an insertion portion for inserting the worm and the motor and a connection portion for connecting a connector. In addition, as the gear box, there is known a terminal which is integrated with the terminal by the insert molding (for example, see JP 6234713 B2).

SUMMARY

As disclosed in JP 6234713 B2, in a case where the terminal is integrated with the gear box body by the insert molding, a melt resin is poured into a cavity in the mold in a state where the terminal is held in the mold. However, the insertion portion and the connection portion of the gear box may be open in different directions, or a place (supporting place) in the mold to hold the terminal may be small in number depending on an ambient structure of the insertion portion and the connection portion. Therefore, the terminal is unstably held, so the quality of the gear box is degraded.

The gear box, the mold, and the manufacturing method of the gear box of the application have been made in view of such problems, and an object thereof is to improve the quality by stably holding the terminal. In addition, an object of the reduction gear and the motor unit provided with the reduction gear of the application is to improve the quality using the gear box. Further, the invention is not limited to these objects, and another object is to achieve an operational effect which is not obtained in the related art but obtained by the configurations of embodiments of the invention described below.

(1) A gear box disclosed herein is a gear box for including a gear therein to transfer rotation of a motor to an output shaft, including: a gear box body which is made of resin; and a terminal which is integrated with the gear box body by insert molding, wherein the gear box body includes a storage portion which stores the gear coaxially disposed with the output shaft, a motor insertion portion which is recessed in an attachment surface of the motor and to which a power supplied side of the motor is inserted, and a connector connection portion which is disposed on the same side as the motor insertion portion with respect to a rotation center of the gear, and is open and recessed in a direction different from the motor insertion portion, and wherein the terminal includes a connector terminal which is exposed to an inside of the connector connection portion, a motor feeding portion which is exposed to an inside of the motor insertion portion, a connecting portion which is buried in the gear box body and connects the connector terminal and the motor feeding portion, and a fixing tab which extends from the connecting portion and is exposed to the inside of the motor insertion portion.

(2) It is preferable that the motor feeding portion and the fixing tab are provided to be separated from each other in a direction of the rotation center.

(3) It is preferable that the motor feeding portion and the fixing tab are provided to be separated from each other in an axial direction of the motor.

(4) It is preferable that the terminal is configured by bending and molding one metal plate.

(5) It is preferable that the connector connection portion is open in a direction opposite to the motor insertion portion.

(6) A reduction gear disclosed herein includes the gear box according to any one of (1) to (5), a worm which is embedded in the gear box, and transfers rotation of a power source, a helical gear which is engaged with the worm and serves as the gear stored in the storage portion.

(7) A motor unit disclosed herein includes the reduction gear of (6), and a motor which is attached to the gear box of the reduction gear, and includes a rotation shaft connected to the worm of the reduction gear.

(8) A mold disclosed herein which is used to manufacture the gear box according to any one of (1) to (5) includes two stationary dies which are assembled from two directions facing each other along the rotation center, and form at least the storage portion, a first slide die which is assembled to the stationary die to form the motor insertion portion, and a second slide die which is assembled to the stationary die to form the connector connection portion. The first slide die includes a holding portion which holds the motor feeding portion and the fixing tab of the terminal.

(9) It is preferable that the first slide die includes a first pin which supports the terminal held by the holding portion in a state of being assembled to the stationary die, and the second slide die includes a second pin which supports the terminal held by the holding portion in a direction different from the first pin in a state of being assembled to the stationary die.

(10) A manufacturing method of integrally molding the gear box according to any one of (1) to (5) using a mold includes holding the motor feeding portion and the fixing tab of the terminal in a holding portion of a first slide die for forming the motor insertion portion, forming a cavity in the mold by assembling the two stationary dies for forming the storage portion from two directions facing each other along the rotation center and by assembling the first slide die and a second slide die for forming the connector connection portion to the stationary die, and supplying melt resin to the cavity.

According to the gear box, the mold, and the manufacturing method of gear box of the invention, when the terminal is integrated with the gear box body by the insert molding, the terminal can be supported at two points (that is, the motor feeding portion and the fixing tab). Therefore, a stable holding of the terminal can be realized, and a molding performance of the mold is improved, and the quality is enhanced. In addition, according to the reduction gear and the motor unit of the invention, the quality can be enhanced using the disclosed gear box.

BRIEF DESCRIPTION OF THE DRAWINGS

FIG. 6 is a schematic view for describing a configuration of a mold to manufacture the gear box of FIG. 3;

FIGS. 7A and 7B are diagrams for describing a holding state of the terminal, in which FIG. 7A is a perspective view illustrating a state where the terminal is held in a first slide die included in the mold of FIG. 6, and FIG. 7B is a side view of the terminal illustrating the held portion;

DESCRIPTION OF THE EMBODIMENTS

With reference to the drawings, the description will be given about a gear box as an embodiment, a reduction gear which includes the gear box, and a motor unit, and also given about a mold to manufacture the gear box and a manufacturing method of the gear box. The following embodiments are given as merely exemplary, and it is not intended to exclude various modifications and various technical applications which are not specified in the embodiments. The configurations of the embodiments can be implemented in various forms within a scope not departing from the spirit thereof. In addition, some of the configurations may be configured optionally, or may be appropriately combined.

[1. Configuration of Motor Unit]

Figure 1:
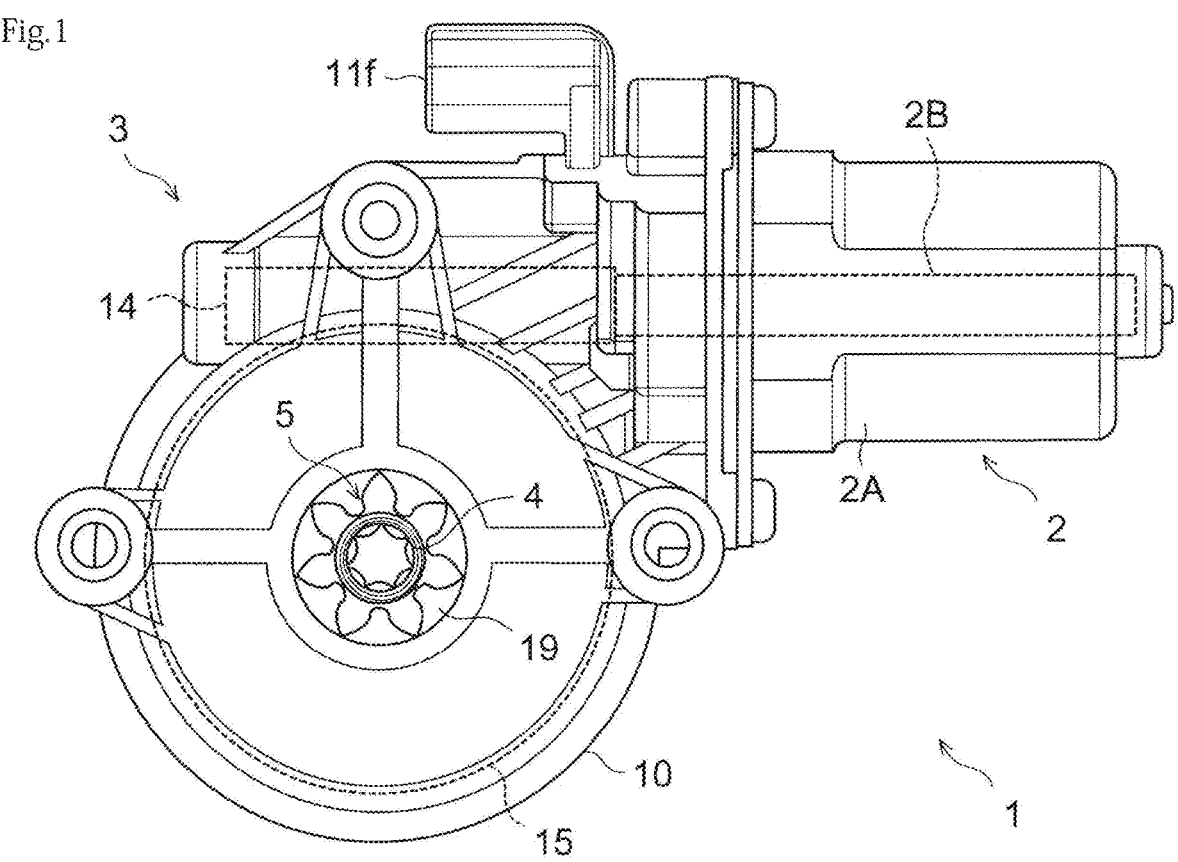
FIG. 1 is a top view of a motor unit according to an embodiment.

FIG. 1 is a top view of a motor unit 1 of this embodiment (a diagram viewed in an axial direction of an output shaft 4 of a reduction gear 3). The motor unit 1 is used as a drive source of a closure device such as a power window device, a back door, and a slide door of a vehicle. The motor unit 1 includes a motor 2 in which a rotor and a stator are embedded (not illustrated in a housing 2A), and the reduction gear 3 which decelerates a rotation speed of the motor 2. The motor 2 of this embodiment is a DC motor with brushes, and the housing 2A is attached to a gear box 10 of the reduction gear 3 to be as a unit with the reduction gear 3.

Figure 2:
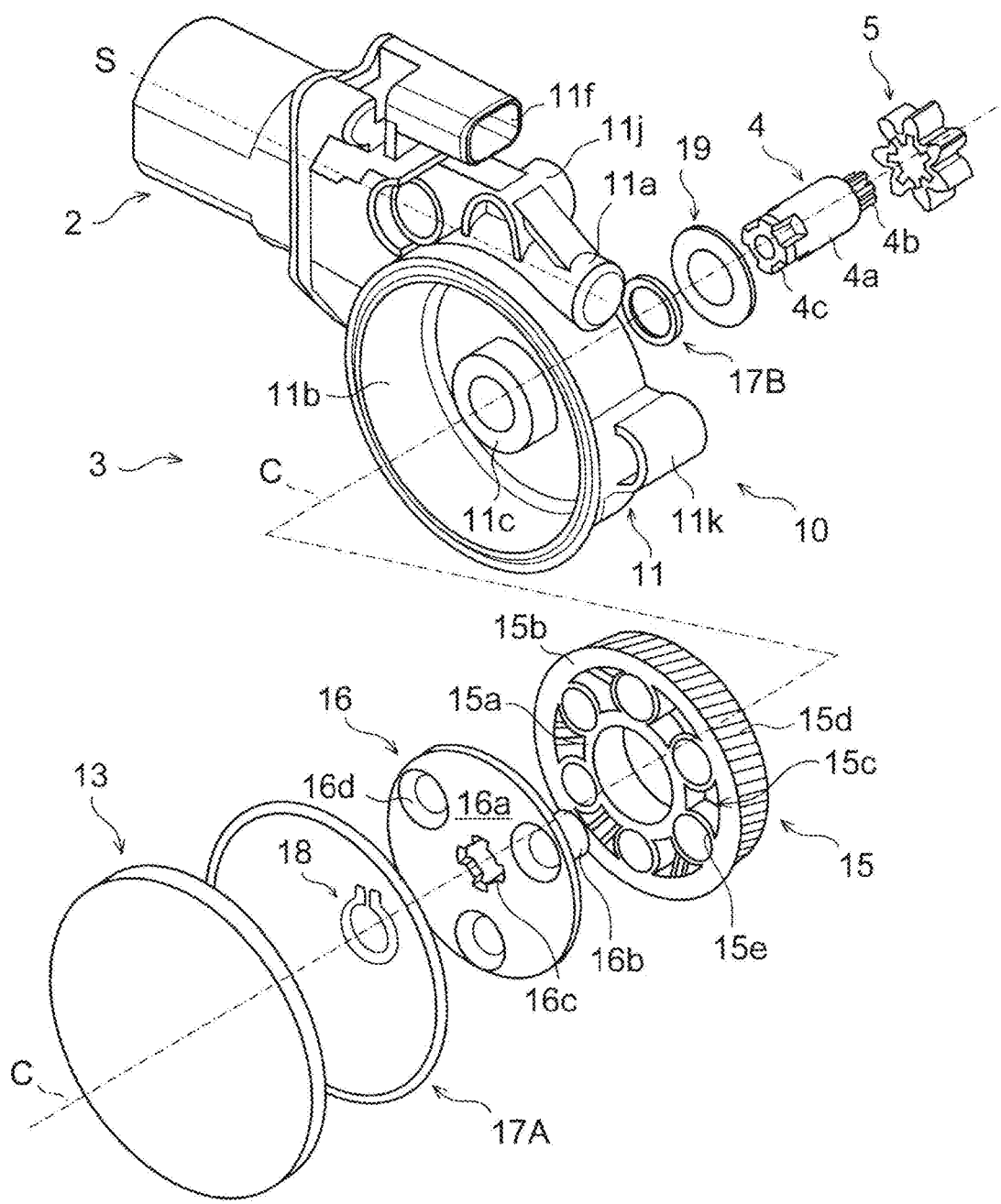
FIG. 2 is an exploded perspective view illustrating a reduction gear in the motor unit of FIG. 1.

FIG. 2 is an exploded perspective view of the reduction gear 3 in the motor unit 1. The reduction gear 3 includes a worm 14 (see FIG. 1) through which the rotation of a power source is transferred and a helical gear 15 which is engaged with the worm, an output plate 16 and the output shaft 4 to take out the output, a seal packing 17A and an O ring 17B as sealing materials, a C-type snap ring 18, and a washer 19. These elements are embedded in the gear box 10, and sealed with a cover 13 (see FIG. 2).

The worm 14 is embedded in a worm storage portion 11a of the gear box 10, and is connected to a rotation shaft 2B of the motor 2 (see FIG. 1). Further, a chain line S in FIG. 2 indicates a center of the rotation shaft 2B of the motor 2 and a rotation center of the worm 14. The worm storage portion 11a extends along the rotation center S of the motor 2 and the worm 14, and is connected to a motor insertion portion 11d described below.

The helical gear 15 is, for example, a resin gear which is formed by injection molding, and is embedded in a helical gear storage portion 11b of the gear box 10. The helical gear storage portion 11b forms an approximate bottomed cylindrical shape, and includes an annular boss 11c which is erected from the bottom portion along a rotation center C of the helical gear 15 which is coaxially disposed with the output shaft 4. The worm storage portion 11a and the helical gear storage portion 11b are connected at the position where the worm 14 and the helical gear 15 are engaged with each other. In other words, a connection hole 11g (see FIG. 3) is provided at a position near the worm storage portion 11a in the peripheral surface of the helical gear storage portion 11b. Further, the configuration of the gear box 10 will be described in detail.

The helical gear 15 is a helical gear (external gear) in which teeth 15d are formed in the outer peripheral surface. The helical gear 15 includes a hub 15a and a rim 15b which are coaxially formed in an annular shape, and an intermediate portion 15c which connects the hub 15a and the rim 15b in a radial direction. The teeth 15d are formed in the outer peripheral surface of the rim 15b. In the intermediate portion 15c, six circular recess portions 15e are provided at an equal interval in a circumferential direction. Three of these six recess portions 15e which are located at a 120-degree interval are engaged with an engagement portion 16b of the output plate 16.

The engagement portion 16b is a portion formed in a cylindrical shape which is connected to an opening 16d passing through a plate portion 16a of the output plate 16, and extends in parallel with the axial direction from the surface of the plate portion 16a near the helical gear 15. In the output plate 16, there is formed a through hole 16c which coaxially passes with the rotation center C of the helical gear 15, and one end portion 4c of the output shaft 4 is fitted to the through hole 16c.

The output shaft 4 is a shaft member which coaxially extends with the rotation center C of the helical gear 15. The output shaft 4 is configured such that an intermediate portion 4a is inserted to the boss 11c of the gear box 10, and an other-end portion 4b protrudes from the bottom portion of the gear box 10 to the outside. In the intermediate portion 4a of the output shaft 4, the O ring 17B and the washer 19 are inserted from the other-end portion 4b toward the outer surface of the bottom portion of the gear box 10. Then, in the other-end portion 4b of the output shaft 4, an output pinion 5 is fitted in a state where the O ring 17B and the washer 19 are interposed with respect to the outer surface of the bottom portion.

The output pinion 5 is a gear through which the rotation (power) of the motor 2 output from the output shaft 4 is transferred. The output pinion 5 and the other-end portion 4b of the output shaft 4 are fitted not to be rotated to each other. Further, when the helical gear 15 and the output plate 16 are stored in the helical gear storage portion 11b, the one end portion 4c of the output shaft 4 is fixed by the C-type snap ring 18. Then, the cover 13 is attached in a state where the seal packing 17A is interposed with respect to the peripheral edge portion of the helical gear storage portion 11b.

[2. Configuration of Gear Box]

Figure 3:
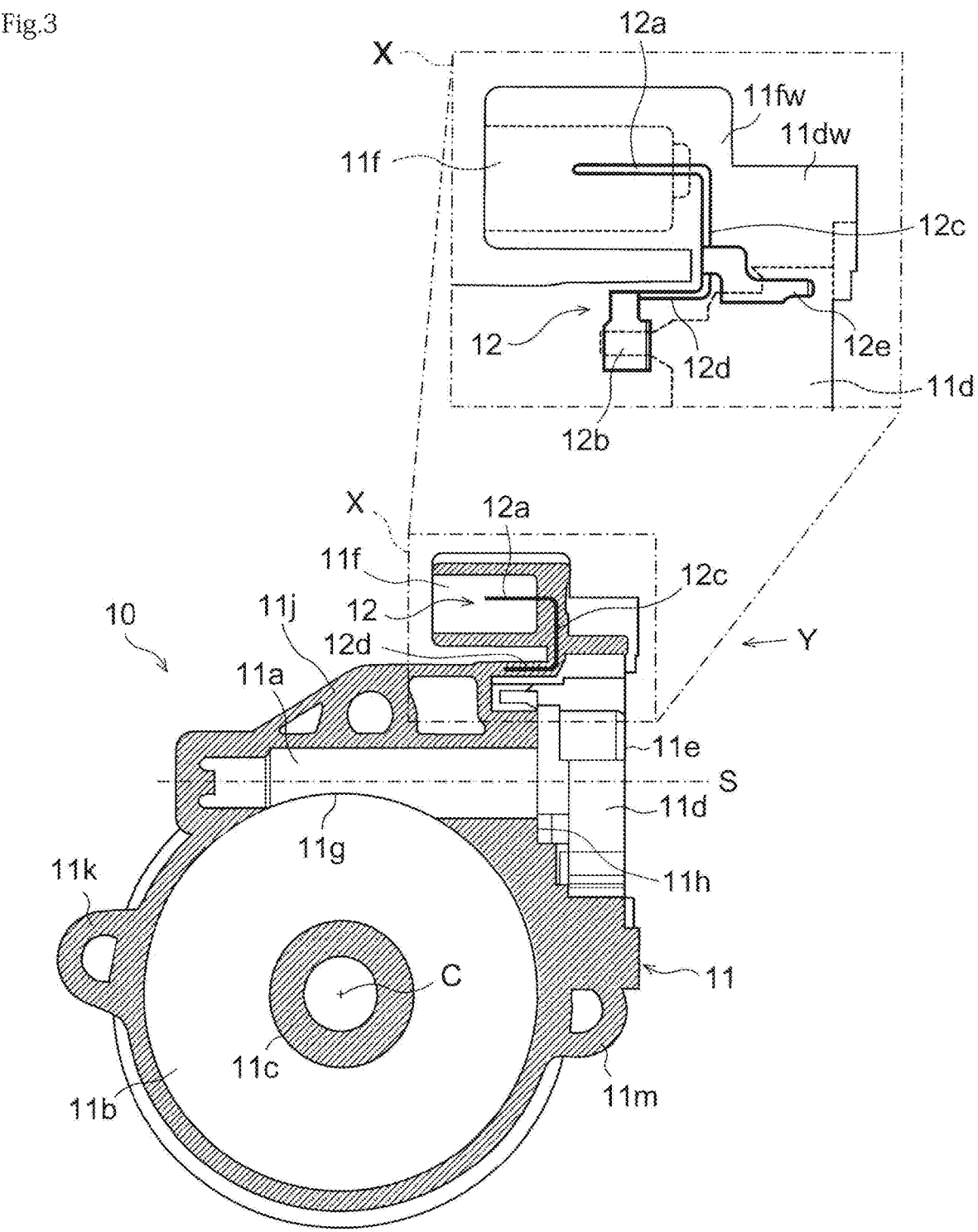
FIG. 3 is a horizontal cross-sectional view of a gear box of the reduction gear of FIG. 2 taken along the axial direction of a motor with a penetrating view of X portion on a magnified scale.

Next, the configuration of the gear box 10 will be described in detail using FIGS. 3 to 5. The gear box 10 is a housing to embed the worm 14 and the helical gear 15 to transfer the rotation of the motor 2 to the output shaft 4. As illustrated in FIG. 3, the gear box 10 includes a gear box body 11 made of resin and two terminals 12 which are integrated with the gear box body 11 by insert molding.

The gear box body 11 is integrally formed by resin, and includes the motor insertion portion 11d and a connector connection portion 11f in addition to the worm storage portion 11a, the helical gear storage portion 11b, and the boss 11c. The motor insertion portion 11d is a portion recessed in an attachment surface 11e of the motor 2, and the power supplied side of the motor 2 is inserted. In a bottom surface 11h of the motor insertion portion 11d, an opening of the end portion of the worm storage portion 11a is formed. Further, the power supplied side of the motor 2 is an end bell side (not illustrated; a side where an electric terminal (not illustrated) protruding to the outside of the housing 2A) which is fixed in the housing 2A of the motor 2. The motor 2 in which the power supplied side is inserted to the motor insertion portion 11d is, for example, fastened to the attachment surface 11e with a bolt.

The connector connection portion 11f is a portion which is disposed on the same side as the motor insertion portion 11d with respect to the rotation center C of the helical gear 15 and is open and recessed in a direction different from the motor insertion portion 11d. A connector (not illustrated) is inserted and attached. The connector bounds, for example, signal lines from an electronic control unit and power lines from a power source (battery), and is fitted and engaged to the inside of the connector connection portion 11f. Further, the "same side" herein means that these portions 11d and 11f are located almost the same direction (within at least 90 degrees about the rotation center C) when the motor insertion portion 11d and the connector connection portion 11f are viewed from the rotation center C.

The gear box 10 of this embodiment is configured such that the connector connection portion 11f is open in the opposite direction to the motor insertion portion 11d, and a connector connection direction to the connector connection portion 11f and an extending direction of the worm storage portion 11a are in parallel. In addition, the connector connection portion 11f of this embodiment is disposed with respect to an attachment portion 11j provided adjacent to the worm storage portion 11a with a slight gap therebetween. As illustrated in FIG. 3 on a magnified scale, part of a bottom wall portion 11fw (a wall portion located on the opposite side of the opening) of the connector connection portion 11f forms part of a side wall portion 11dw forming the motor insertion portion 11d. Further, the attachment portion 11j is provided on the opposite side of the helical gear storage portion 11b with respect to the worm storage portion 11a, and includes a hole portion through which a fastening tool (not illustrated) is inserted. In addition, in the gear box 10 of this embodiment, two attachment portions 11k and 11m are provided around the helical gear storage portion 11b in addition to the attachment portion 11j.

The terminal 12 is a conducting component which is formed of a conductive material (for example, metal), and part of the terminal is buried in the gear box body 11. The terminal 12 of this embodiment is configured by bending a sheet of metal plate as illustrated in FIG. 5. In addition, the two terminals 12 are formed in mirror plane symmetry with respect to a virtual plane extending in a direction (herein, a direction other than the rotation center S) orthogonal to the axial direction of the output shaft 4 along the rotation center S of the motor 2. In the terminal 12, there are provided a connector terminal 12a, a motor feeding portion 12b, connecting portions 12c and 12d, and a fixing tab 12e.

As illustrated in FIG. 3, the connector terminal 12a is a rectangular plate portion which includes a portion exposed to the inside of the connector connection portion 11f. A signal line and a power line provided in the connector are connected in the exposed portion of the connector terminal 12a. As illustrated in FIGS. 3 and 4, the motor feeding portion 12b is an approximately rectangular plate portion which includes a portion exposed to the inside of the motor insertion portion 11d. The electric terminal of the motor 2 is connected in the exposed portion of the motor feeding portion 12b. Further, a normal direction of the connector terminal 12a and a normal direction of the motor feeding portion 12b are different from each other. Specifically, the former extends in a direction orthogonal to any one of the rotation center S of the motor 2 and the rotation center C of the helical gear 15, and the latter extends in parallel to the rotation center C of the helical gear 15.

The connecting portions 12c and 12d are portions connecting the connector terminal 12a and the motor feeding portion 12b, and completely buried in the gear box body 11. In the terminal 12 of this embodiment, as illustrated in FIGS. 3 and 5, there are provided a first connecting portion 12c bent in almost the right angle with respect to the connector terminal 12a and a second connecting portion 12d bent in almost the right angle toward the connector terminal 12a with respect to the first connecting portion 12c. The first connecting portion 12c is a rectangular plate portion extending in the normal direction of the connector terminal 12a. The second connecting portion 12d is a rectangular plate portion in parallel (facing) to the connector terminal 12a. In other words, the terminal 12 of this embodiment includes a U-liked portion formed by the connector terminal 12a, the first connecting portion 12c, and the second connecting portion 12d.

The motor feeding portion 12b is bent and extends from the side edge of the leading end portion of the second connecting portion 12d to be separated from the connector terminal 12a toward a normal direction (that is, the normal direction of the connector terminal 12a) of the second connecting portion 12d. As illustrated in FIG. 3 on a magnified scale, the exposed portion of the motor feeding portion 12b is located at a mid-position excluding the base end portion and the leading end portion. In other words, the base end portion and the leading end portion of the motor feeding portion 12b both are buried in the gear box body 11. In addition, as illustrated in FIG. 5, the edge of the motor feeding portion 12b on a side near the motor 2 is formed in a taper shape such that the thickness becomes thinner as it goes toward the end. The taper portion is interposed in a first holding portion 23a of a first slide die 23 described below.

Figure 4:
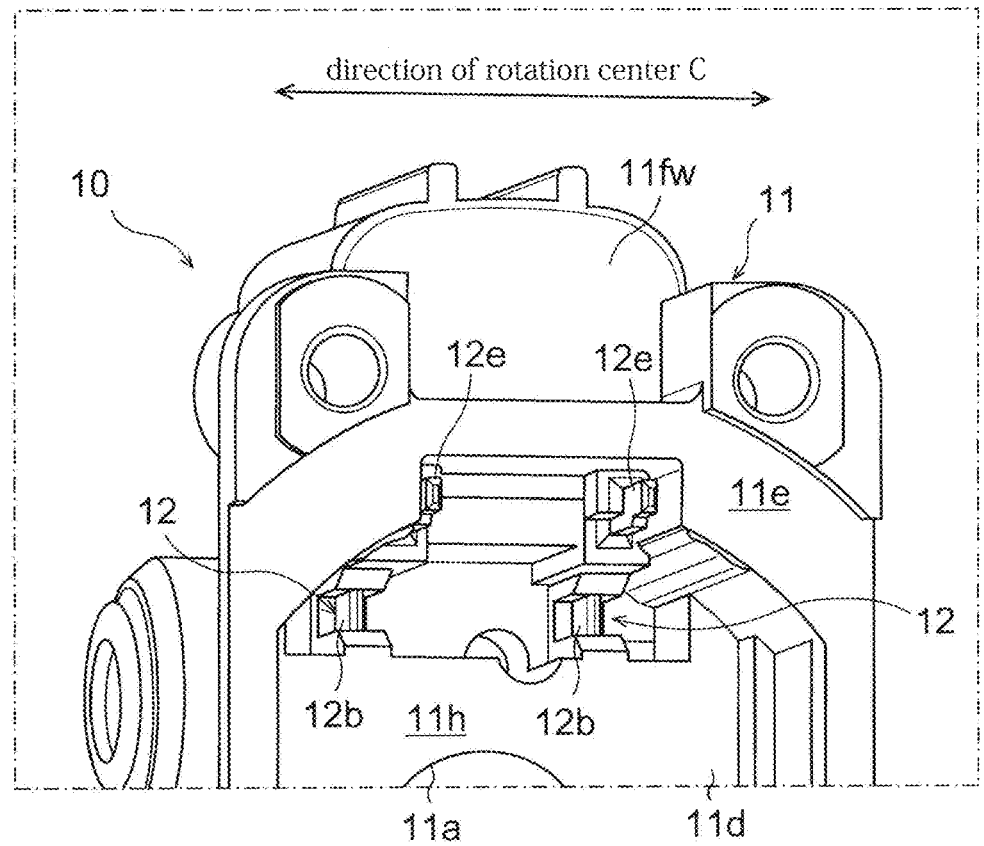
FIG. 4 is a side view of X portion of FIG. 3 when viewed in a Y direction.
Figure 5:
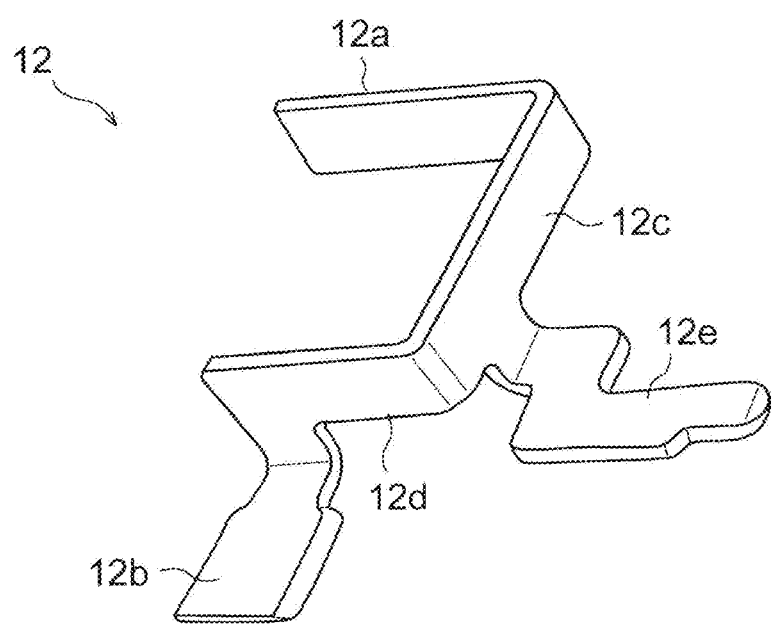
FIG. 5 is a perspective view of a terminal which is embedded in the gear box of FIG. 3.

As illustrated in FIGS. 3 and 4, the fixing tab 12e is a plate portion of a crank shape including a portion exposed to the inside of the motor insertion portion 11d. The exposing portion of the fixing tab 12e may be used against electrical noises between terminals for example. The fixing tab 12e is bent and extends from the side edge of the first connecting portion 12c to be separated from the connector terminal 12a toward the axial direction of the motor 2. The fixing tab 12e of this embodiment extends from the position near the second connecting portion 12d in the first connecting portion 12c.

In addition, as illustrated in FIG. 3 on a magnified scale, the exposed portion of the fixing tab 12e is located at the leading end portion. In other words, the fixing tab 12e is buried in the gear box body 11 from the base end portion up to the mid-position. In the leading end portion of the fixing tab 12e, a part on a side near the rotation center of the motor 2 is cut off to avoid interference with the power supplied side of the inserted motor 2. In addition, as illustrated in FIG. 5, the edge of the fixing tab 12e on a side near the motor 2 is formed in a taper shape such that the thickness becomes thinner as it goes toward the end. The taper portion is interposed in a second holding portion 23b of a first slide die 23 described below.

As illustrated in FIG. 4, the gear box 10 of this embodiment is configured such that the motor feeding portions 12b and the fixing tabs 12e exposed in the motor insertion portion 11d are provided to be separated from each other in the direction of the rotation center C of the helical gear 15. Further, the motor feeding portion 12b and the fixing tab 12e of this embodiment are provided to be separated from each other even in the axial direction of the motor 2. Further, the motor feeding portion 12b and the fixing tab 12e are separated from each other even in a direction orthogonal to any one of the rotation centers C and S. In other words, the motor feeding portion 12b and the fixing tab 12e are disposed at three-dimensionally separated positions in the motor insertion portion 11d. A portion buried in the gear box body 11 in the terminals 12 is a portion disposed in a cavity in a mold 20 (described below), and the exposed portion is a portion not disposed in the cavity.

[3. Manufacturing Method of Gear Box]

Next, a manufacturing method of the gear box 10 will be described using FIGS. 6 to 8. The above-described gear box 10 is manufactured by pouring molten resin into the cavity 25 which is formed in the mold 20 as illustrated in FIG. 6. The mold 20 includes two stationary dies 21 and 22 and two slide dies 23 and 24, and these four dies are assembled (combined) to form the cavity 25 which is matched to the shape of the gear box 10. Further, in FIG. 6, the stationary dies 21 and 22 are illustrated with a two-dot chain line, and the slide dies 23 and 24 are illustrated with a broken line.

The two stationary dies 21 and 22 are assembled from two directions facing each other along the rotation center C of the helical gear 15, and form at least the helical gear storage portion 11b. Specifically, in one stationary die 21 (hereinafter, referred to as "first stationary die 21"), there is formed a recess portion (not illustrated) matched with the outer shapes of the worm storage portion 11a and the helical gear storage portion 11b of the gear box 10. In the other stationary die 22 (hereinafter, referred to as "second stationary die 22"), there is formed a projecting portion (not illustrated) matched with the inner shapes of the helical gear storage portion 11b and the attachment portions 11j, 11k, and 11m.

The two slide dies 23 and 24 both are assembled to the stationary dies 21 and 22. The former forms the motor insertion portion 11d, and the latter forms the connector connection portion 11f. In this embodiment, the two slide dies 23 and 24 both are an example of the mold 20 which is assembled to the second stationary die 22. In one slide die 23 (hereinafter, referred to as "first slide die 23"), there are formed projecting portions 23c and 23d (see FIG. 7A) matched with the inner shapes of the motor insertion portion 11d and the worm storage portion 11a. In the other slide die 24 (hereinafter, referred to as "second slide die 24"), there is formed a projecting portion matched with the inner shape of the connector connection portion 11f.

Figure 7A:
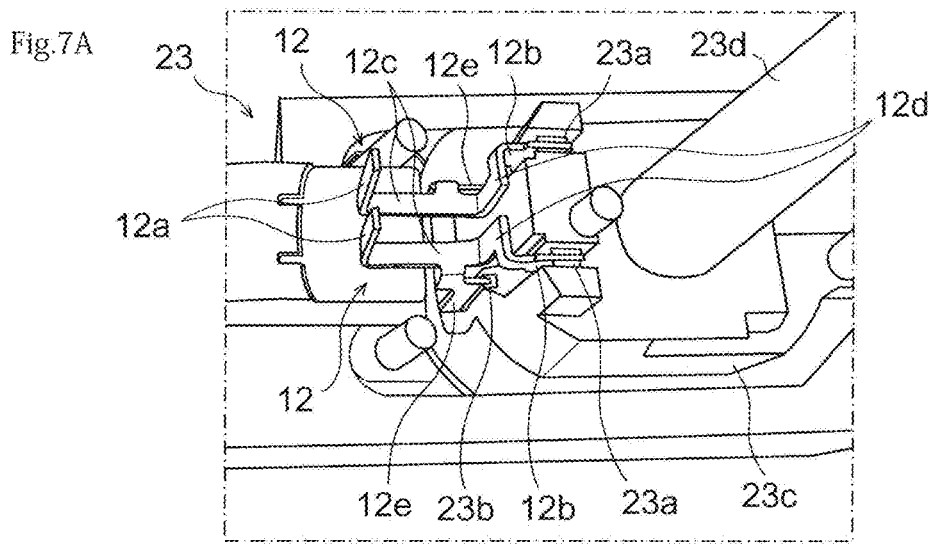
Figure 7B:
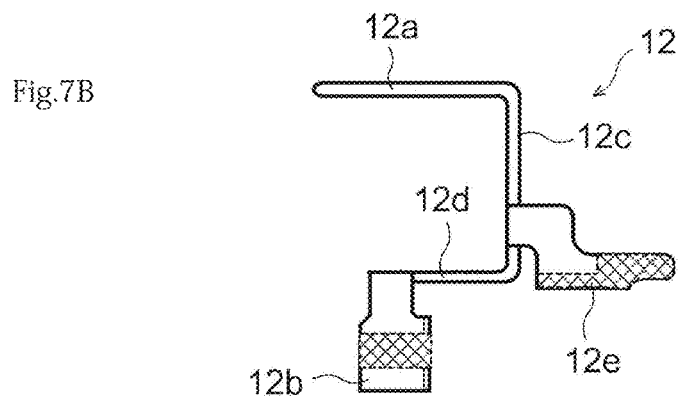

Further, in the first slide die 23, as illustrated in FIG. 7A, there are provided the first holding portion 23a which holds the motor feeding portion 12b of the two terminals 12, and the second holding portion 23b which holds the fixing tab 12e of the two terminals 12. In other words, the terminal 12 is disposed in the cavity 25 in a state where the shadow portions in FIG. 7B are held (interposed) by the first holding portion 23a and the second holding portion 23b (in a state of being set in the first slide die 23).

Figure 8:
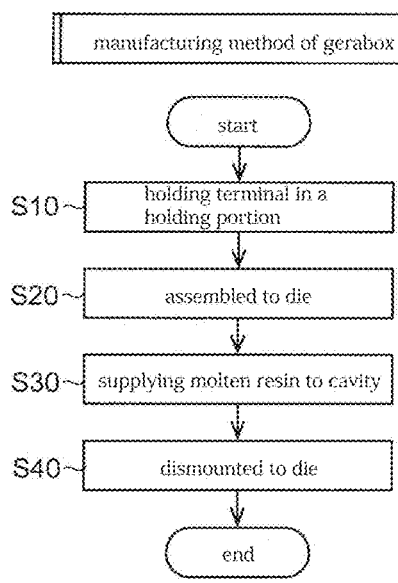
FIG. 8 is a flowchart for describing a procedure of a manufacturing method of the gear box according to an embodiment.

In other words, in a case where the gear box 10 of this embodiment is integrally formed using the mold 20, first, the motor feeding portion 12b and the fixing tab 12e of the terminal 12 are respectively held by the holding portions 23a and 23b of the first slide die 23 (step S10 of FIG. 8). Next, the two stationary dies 21 and 22 are assembled from two directions facing each other along the rotation center C and the two slide dies 23 and 24 are assembled in the stationary dies 21 and 22 so as to form the cavity 25 in the mold 20 (step S20).

Further, in this embodiment, the two slide dies 23 and 24 are assembled in the second stationary die 22 and assembled to the first stationary die 21. The order of assembling the dies 21 to 24 is not limited to the above order. For example, one of the two slide dies 23 and 24 may be assembled to the first stationary die 21, and the other of the two slide dies 23 and 24 may be assembled to the second stationary die 22, and then the two stationary dies 21 and 22 may be assembled. Alternatively, after the two stationary dies 21 and 22 are assembled, the two slide dies 23 and 24 may be assembled.

After the mold 20 is assembled, the molten resin is supplied from a gate (not illustrated) to the cavity 25, and the insert molding is performed on the terminal 12 and the gear box body 11 (step S30). Then, if the mold 20 is removed (step S40), the gear box body 11 and the terminal 12 are integrated to complete the gear box 10.

[4. Results]

(1) Therefore, according to the gear box 10, the manufacturing method thereof, and the mold 20, the terminal 12 can be supported at two points (the motor feeding portion 12b and the fixing tab 12e) when the terminal 12 is integrated with the gear box body 11 by the insert molding. Therefore, the terminal can be stably held, a molding performance of the mold 20 is improved, and a high quality is achieved.

In addition, the connector terminal 12a may not be held by the second slide die 24 forming the connector connection portion 11f depending on the shape of the gear box 10. For example, in the case of the gear box 10, as illustrated in FIG. 3, the connector connection portion 11f is disposed with a slight gap with respect to the attachment portion 11j. Therefore, part (the connector terminal 12a) of the terminal 12 is not possible to be held by the second slide die 24 which forms the connector connection portion 11f. Even in such a shape, according to the gear box 10, the manufacturing method thereof, and the mold 20, the terminal 12 can be held at two points, and the gear box 10 can be manufactured regardless of an ambient shape of the connector connection portion 11f. Further, it is possible to manufacture the gear box 10 in which the direction of the connector connection portion 11f is different from that of the motor insertion portion 11d, so that the gear box 10 can be increased in variation.

(2) According to the gear box 10, the motor feeding portion 12b and the fixing tab 12e are provided to be separated from each other in the direction of the rotation center C of the helical gear 15, so that the terminal 12 can be more stably held.

(3) Further, the motor feeding portion 12*b* and the fixing tab 12*e* are provided to be separated from each other even in the axial direction of the motor 2, so that the terminal 12 can be more stably held.

(4) According to the gear box 10, the terminal 12 is molded by bending one metal plate, so that the manufacturing can be simplified.

(5) In addition, according to the gear box 10, even if the connector connection portion 11*f* and the motor insertion portion 11*d* are open in the directions opposite to each other, the terminal 12 can be stably held. Therefore, the terminal 12 can be integrated with the gear box body 11 by the insert molding, and the gear box 10 of high quality can be manufactured.

(6) According to the reduction gear 3, with the above configuration of the gear box 10 embedding the helical gear 15, the quality of the reduction gear 3 can be increased, the variations can be increased, and a value as a product can be enhanced (7) Further, according to the motor unit 1 equipped with the reduction gear 3, similarly, the quality can be increased, the variations can be increased, and the value as a product can be enhanced.

[5. Others]

The shapes of the gear box 10, and the configurations of the reduction gear 3 and the motor unit 1 are given as merely exemplary, and the invention is not limited thereto. For example, the connector connection portion 11*f* and the motor insertion portion 11*d* may not be configured in the opposite direction. The connector connection portion may be open toward the cover 13 or toward the output pinion 5, or may be open toward a direction intersecting both the rotation centers S and C. In addition, the position of the connector connection portion 11*f* is also not limited to the above-described position.

In the gear box, there may be provided at least a storage portion which stores a gear (the helical gear 15 in the embodiment) coaxially disposed with the output shaft 4, a motor insertion portion to which the power supplied side of the motor 2 is inserted, and the connector connection portion to which a connector is inserted and attached. For example, the attachment portions 11*j*, 11*k*, and 11*m* may be omitted. Further, the shape of the mold may be provided in accordance with the shape of the gear box.

Figure 9:
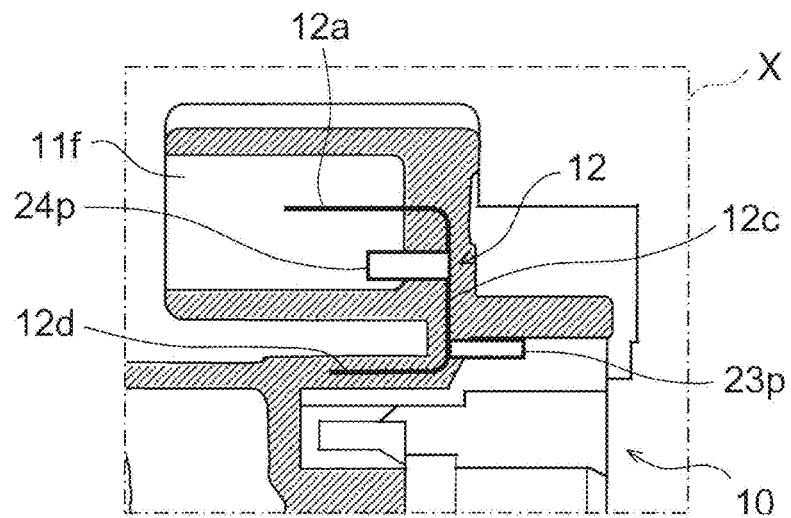
FIG. 9 is a cross-sectional view of X portion of FIG. 3 for describing a modification of the mold for manufacturing the gear box of FIG. 3.

In addition, a pin-shaped portion may be provided in the mold 20 to support the terminal 12. For example, in the first slide die 23 forming the motor insertion portion 11*d*, a first pin 23*p* is provided to support the terminal 12 which is held by the holding portions 23*a* and 23*b* (see FIG. 9). Further, in the second slide die 24 forming the connector connection portion 11*f*, a second pin 24*p* is provided to support the terminal 12 which is held by the holding portions 23*a* and 23*b* (see FIG. 9). These two pins 23*p* and 24*p* are provided to abut on the first connecting portion 12*c* of the terminal 12 which is held in a state where the two slide dies 23 and 24 are respectively assembled to the stationary dies 21 and 22. With this configuration, the held terminal 12 is supported by two pins 23*p* and 24*p* from the directions different from each other. Therefore, a holding state is more stable, and the molding performance of the mold 20 is increased, so that the quality is increased. Further, in the example illustrated in FIG. 9, the two pins 23*p* and 24*p* support the first connecting portion 12*c* of the terminal 12 in the opposite direction, but the supporting direction of the pins 23*p* and 24*p* is not limited thereto. In addition, also the supporting portion of the terminal 12 is not limited to the first connecting portion 12*c*.

The shape of the terminal 12 is also given as an example, and is not limited to the above embodiment. For example, the motor feeding portion 12*b* and the fixing tab 12*e* may be separated from each other in any one of the direction of the rotation center C of the helical gear 15 and the axial direction of the motor 2. Alternatively, in these directions, the motor feeding portion 12*b* and the fixing tab 12*e* may be provided to be matched. In addition, the terminal 12 is configured such that the fixing tab 12*e* extends from the first connecting portion 12*c*. The fixing tab 12*e* may extend from the second connecting portion 12*d*.

In addition, two portions (the first connecting portion 12*c* and the second connecting portion 12*d*) may be configured to connect the connector terminal 12*a* and the motor feeding portion 12*b*. For example, the connector terminal 12*a* and the motor feeding portion 12*b* may be connected by one connection portion of a curved surface shape. The shape and the position of the fixing tab 12*e* are also given as an example, and may be formed in a crank shape as described above. In addition, a portion held by the holding portions 23*a* and 23*b* may not be the shadow portion of FIG. 7B. As long as the terminal 12 is configured to be held at two points (the motor feeding portion and the fixing tab) by the slide die, the portion exposed into the motor insertion portion 11*d* is formed, and the same effect is achieved similarly to the above embodiment. Further, only the fixing tab may be attached later by welding instead of the configuration that the terminal is made of one metal plate.

In addition, in the reduction gear 3, the output shaft 4 protrudes from the bottom surface of the gear box 10, but a stationary shaft corresponding to the output shaft 4 may be fixed to the gear box. In addition, the shapes of the helical gear 15 and the output plate 16 are given as an example, and the invention is not limited.

The invention claimed is:

1. A gear box for including a gear therein to transfer rotation of a motor to an output shaft, comprising:
   a gear box body which is made of resin; and
   a terminal which is integrated with the gear box body by insert molding,
   wherein the gear box body includes
      a storage portion which stores the gear coaxially disposed with the output shaft,
      a motor insertion portion which is recessed in an attachment surface of the motor and to which a power supplied side of the motor is inserted, and
      a connector connection portion which is disposed on the same side as the motor insertion portion with respect to a rotation center of the gear, and is open and recessed in a direction different from the motor insertion portion, and
   wherein the terminal includes
      a connector terminal which is exposed to an inside of the connector connection portion,
      a motor feeding portion which is exposed to an inside of the motor insertion portion,
      a connecting portion which is buried in the gear box body and connects the connector terminal and the motor feeding portion, and
      a fixing tab which extends from the connecting portion and is exposed to the inside of the motor insertion portion.

2. The gear box according to claim 1, wherein
the motor feeding portion and the fixing tab are provided to be separated from each other in a direction of the rotation center.

3. The gear box according to claim 1, wherein
the motor feeding portion and the fixing tab are provided to be separated from each other in an axial direction of the motor.

4. The gear box according to claim 1, wherein
the terminal is configured by bending and molding one metal plate.

5. The gear box according to claim 1, wherein
the connector connection portion is open in a direction opposite to the motor insertion portion.

6. A reduction gear, comprising:
the gear box according to claim 1;
a worm which is embedded in the gear box, and transfers rotation of a power source; and
a helical gear which is engaged with the worm and serves as the gear stored in the storage portion.

7. A motor unit, comprising:
the reduction gear according to claim 6; and
a motor which is attached to the gear box of the reduction gear, and includes a rotation shaft connected to the worm of the reduction gear.

8. A manufacturing method of integrally molding the gear box according to claim 1 using a mold, comprising:
holding the motor feeding portion and the fixing tab of the terminal in a holding portion of a first slide die for forming the motor insertion portion;
forming a cavity in the mold by assembling the two stationary dies for forming the storage portion from two directions facing each other along the rotation center and by assembling the first slide die and a second slide die for forming the connector connection portion to the stationary die; and
supplying molten resin to the cavity.

9. A mold used to manufacture a gear box for including a gear therein to transfer rotation of a motor to an output shaft, the gear box comprising a gear box body which is made of resin; and a terminal which is integrated with the gear box body by insert molding, wherein the gear box body includes a storage portion which stores the gear coaxially disposed with the output shaft, a motor insertion portion which is recessed in an attachment surface of the motor and to which a power supplied side of the motor is inserted, and a connector connection portion which is disposed on the same side as the motor insertion portion with respect to a rotation center of the gear, and is open and recessed in a direction different from the motor insertion portion, and wherein the terminal includes a connector terminal which is exposed to an inside of the connector connection portion, a motor feeding portion which is exposed to an inside of the motor insertion portion, a connecting portion which is buried in the gear box body and connects the connector terminal and the motor feeding portion, and a fixing tab which extends from the connecting portion and is exposed to the inside of the motor insertion portion, the mold comprising:
two stationary dies which are assembled from two directions facing each other along the rotation center, and configured to mold at least the storage portion;
a first slide die which is assembled to the stationary die and configured to mold the motor insertion portion; and
a second slide die which is assembled to the stationary die and configured to mold the connector connection portion, wherein
the first slide die includes a holding portion configured to hold the motor feeding portion and the fixing tab of the terminal.

10. The mold according to claim 9, wherein
the first slide die includes a first pin configured to support the terminal held by the holding portion in a state of being assembled to the stationary die, and wherein
the second slide die includes a second pin configured to support the terminal held by the holding portion in a direction different from the first pin in a state of being assembled to the stationary die.

* * * * *